(12) United States Patent
Lee et al.

(10) Patent No.: US 7,020,277 B1
(45) Date of Patent: Mar. 28, 2006

(54) DSL LINE INTERFACE HAVING LOW-PASS FILTER CHARACTERISTIC WITH REDUCED EXTERNAL COMPONENTS

(75) Inventors: Sang-Soo Lee, Cupertino, CA (US);
Samuel W. Sheng, San Jose, CA (US);
Cormac S. Conroy, Sunnyvale, CA (US)

(73) Assignee: LSI Logic Corporation, Milpitas, CA (US)

( * ) Notice: Subject to any disclaimer, the term of this patent is extended or adjusted under 35 U.S.C. 154(b) by 753 days.

(21) Appl. No.: 10/011,153

(22) Filed: Dec. 5, 2001

(51) Int. Cl.
*H04B 1/52* (2006.01)

(52) U.S. Cl. .......................... 379/405; 379/391
(58) Field of Classification Search ........ 379/402–405, 379/391
See application file for complete search history.

(56) References Cited

U.S. PATENT DOCUMENTS 4,034,166 A * 7/1977 Hollis ...................... 379/405
4,485,277 A * 11/1984 Minch et al. ............... 379/402
5,479,504 A * 12/1995 Nakano et al. ............. 379/405
6,542,604 B1 * 4/2003 Blon et al. .................. 379/394
6,621,346 B1 * 9/2003 Nabicht et al. ............. 375/222
6,681,012 B1 * 1/2004 Gorcea et al. .............. 379/402

* cited by examiner

*Primary Examiner*—Daniel Swerdlow
(74) *Attorney, Agent, or Firm*—Thelen Reid & Priest LLP (57) ABSTRACT

A line interface couples a data transceiver to a transmission line via a transformer, the data transceiver transmitting signals in a first frequency range and receiving signals in a second frequency range. The line interface includes an input port for receiving an input signal voltage from an analog front end (AFE) chip, an output port, a line driver for amplifying the input signal voltage and supplying a transmit signal to the output port, a line port for sending the transmit signal and receiving a receive signal, termination resistors coupled between the output port and the line port, a receive signal port for supplying the receive signal to the AFE chip, a receive amplifier formed on the AFE chip coupled to the receive signal port, and a bridge network resistively coupling the line port and the output port to the receive signal port, the bridge network having a low-pass filter characteristic.

19 Claims, 9 Drawing Sheets

Figure 1:
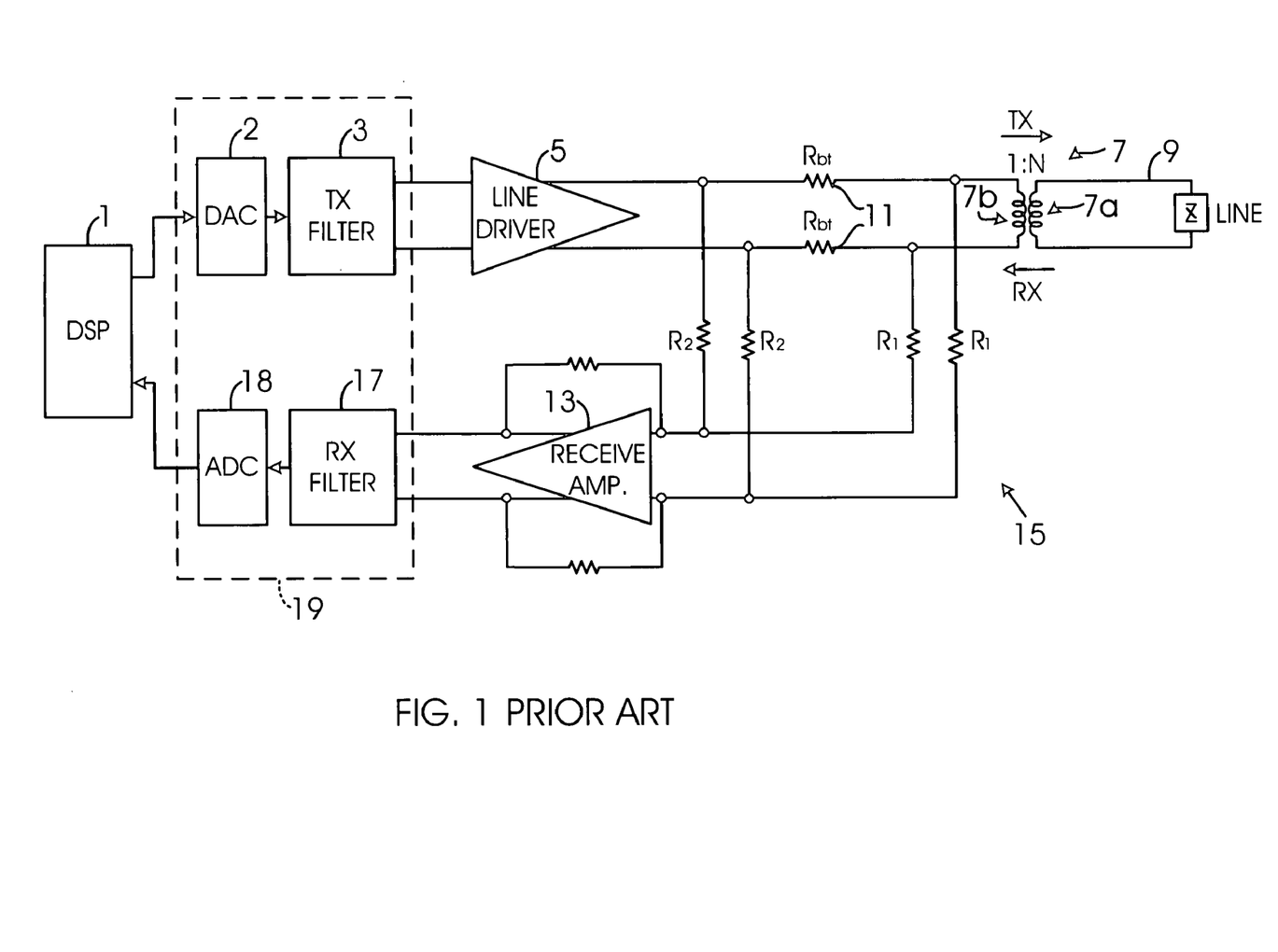
FIG. 1 is an electrical diagram schematically illustrating a conventional asymmetric digital subscriber line (ADSL) transceiver system at a central office (CO) side.

FIG. 9 ically illustrates a conventional DSL line interface. In a DSL system, the same transmission line is used for bi-directional communication between a telephone company's central office (CO) and a remote terminal (RT) or customer premises equipment (CPE). Communication from a CO to an RT/CPE is referred to as "downstream," while communication from an RT/CPE to the CO is referred to as "upstream." Signals used for ADSL communication, for example, discrete mulitone (DMT) signals, are allocated by their frequency depending upon the direction of communication. Typically, in ADSL systems using frequency division multiplexing (CDM), a higher and wider frequency range, for example, 160 kHz to 1.1 MHz, is allocated to the downstream communication, and a lower and narrower frequency range, for example, 30 kHz to 138 kHz, is allocated to the upstream communication. A CO side transceiver transmits a transmit signal Tx in the downstream communication and receives a receive signal Rx in the upstream communication.

DSL LINE INTERFACE HAVING LOW-PASS FILTER CHARACTERISTIC WITH REDUCED EXTERNAL COMPONENTS

FIELD OF THE INVENTION

The present invention relates to digital subscriber line (DSL) technologies. More particularly, the present invention relates to a low-voltage analog line interface for an asymmetrical digital subscriber line (ADSL) transceiver system.

BACKGROUND OF THE INVENTION

FIG. 1 schematically illustrates a conventional DSL line interface. In a DSL system, the same transmission line is used for bi-directional communication between a telephone company's central office (CO) and a remote terminal (RT) or customer premises equipment (CPE). Communication from a CO to an RT/CPE is referred to as "downstream," while communication from an RT/CPE to the CO is referred to as "upstream." Signals used for ADSL communication, for example, discrete mulitone (DMT) signals, are allocated by their frequency depending upon the direction of communication. Typically, in ADSL systems using frequency division multiplexing (CDM), a higher and wider frequency range, for example, 160 kHz to 1.1 MHz, is allocated to the downstream communication, and a lower and narrower frequency range, for example, 30 kHz to 138 kHz, is allocated to the upstream communication. A CO side transceiver transmits a transmit signal Tx in the downstream communication and receives a receive signal Rx in the upstream communication.

At a CO side, as shown in FIG. 1, the transmit signal Tx is typically supplied from a digital signal processing (DSP) processor 1 through a digital to analog converter (DAC) 2 to a transmit signal filter 3. The transmit signal filter 3 complies with ADSL transmission mask specifications so as to provide sufficient filtering in the transmit direction. The transmit signal Tx is then supplied with sufficient voltage and current by the line driver 5, and then coupled via a transformer 7 to a transmission line 9. The transformer 7 includes the primary 7a and the secondary 7b, and has a turns ratio of 1:n. The transmission line 9, such as a telephone line or twisted-pair loop, has a certain line impedance Z (typically 100 Ω).

The receive signal Rx is sensed using back termination resistors 11 and supplied to a line receive amplifier 13 through a resistive bridge network 15. The line receive amplifier 13 sums the receive signal Rx and the attenuated transmit signal Tx seen at the secondary 7b of the transformer 7 with a weighted, opposite phase transmit signal Tx seen at the line driver output. This weighted summing of the transmit signal Tx ideally cancels the 180° out-of-phase signal, leaving only the receive signal Rx at the receive amplifier output. This function is called as "echo cancellation" or hybrid rejection. The line receive amplifier 13 also provides a gain to the receive signal Rx before passing it to a receive signal filter (low-pass filter) 17. The receive signal Rx is then supplied to the DSP 1 through an analog-to-digital converter (ADC) 18.

As shown in FIG. 1, the transmit signal filter 3, the receive signal filter 17, the DAC 2, and the ADC 18 are typically integrated in an analog front end (AFE) chip 19, and the hybrid function is implemented using the resistive bridge network 15 and the off-chip line receive amplifier 13. Since the echo cancellation is not always ideal in an actual implementation, the line receive amplifier 13 is required to have a sufficiently large dynamic range in order to handle an out-of-band echo when the hybrid rejection is poor.

It is desirable to integrate the line receive amplifier 13 into the AFE chip 19 in order to reduce the number of off-chip (external) components. In addition, an on-chip amplifier can be made programmable so as to control its gain and/or other characteristics. In this case, however, the on-chip line receive amplifier has to operate using the same supply voltage as that of the AFE chip 19. However, since the AFE chip supply voltage is typically lower than that of an off-chip line receive amplifier 13, an on-chip line receive amplifier may not be able to provide a necessary dynamic range and gain when the echo cancellation is insufficient. That is, a large echo entering the AFE circuit limits the gain of the receive amplifier to a low value, or even requires attenuation of the receive signal. In addition, since the input-referred noise of the receive amplifier usually increases at a lower gain, it will reduce the receiver sensitivity.

Therefore, it would be desirable to provide an architecture which reduces an input-referred noise when the hybrid rejection is poor. Furthermore, it would also be desirable to provide these advantages in a simple, cost-effective manner.

BRIEF DESCRIPTION OF THE INVENTION

A line interface couples a data transceiver to a transmission line having a load impedance Z via a transformer having a turns ratio of 1:n, the data transceiver transmitting signals in a first frequency range and receiving signals in a second frequency range different from the first frequency range. The line interface includes an input port for receiving an input signal voltage from a circuit formed on an analog front end (AFE) chip, an output port, a line driver coupled between the input port and the output port, the line driver amplifying the input signal voltage and supplying an amplified signal as a transmit signal to the output port, a line port for sending the transmit signal to and receiving a receive signal from the transformer, termination resistors coupled between the output port and the line port, a receive signal port for supplying the receive signal to the AFE chip, a receive amplifier formed on the AFE chip coupled to the receive signal port, and a bridge network resistively coupling the line port and the output port to the receive signal port, the bridge network having a low-pass filter characteristic.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a DSL line interface having a low-pass filter characteristic with reduced external components. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skilled in the art having the benefit of this disclosure.

Figure 2:
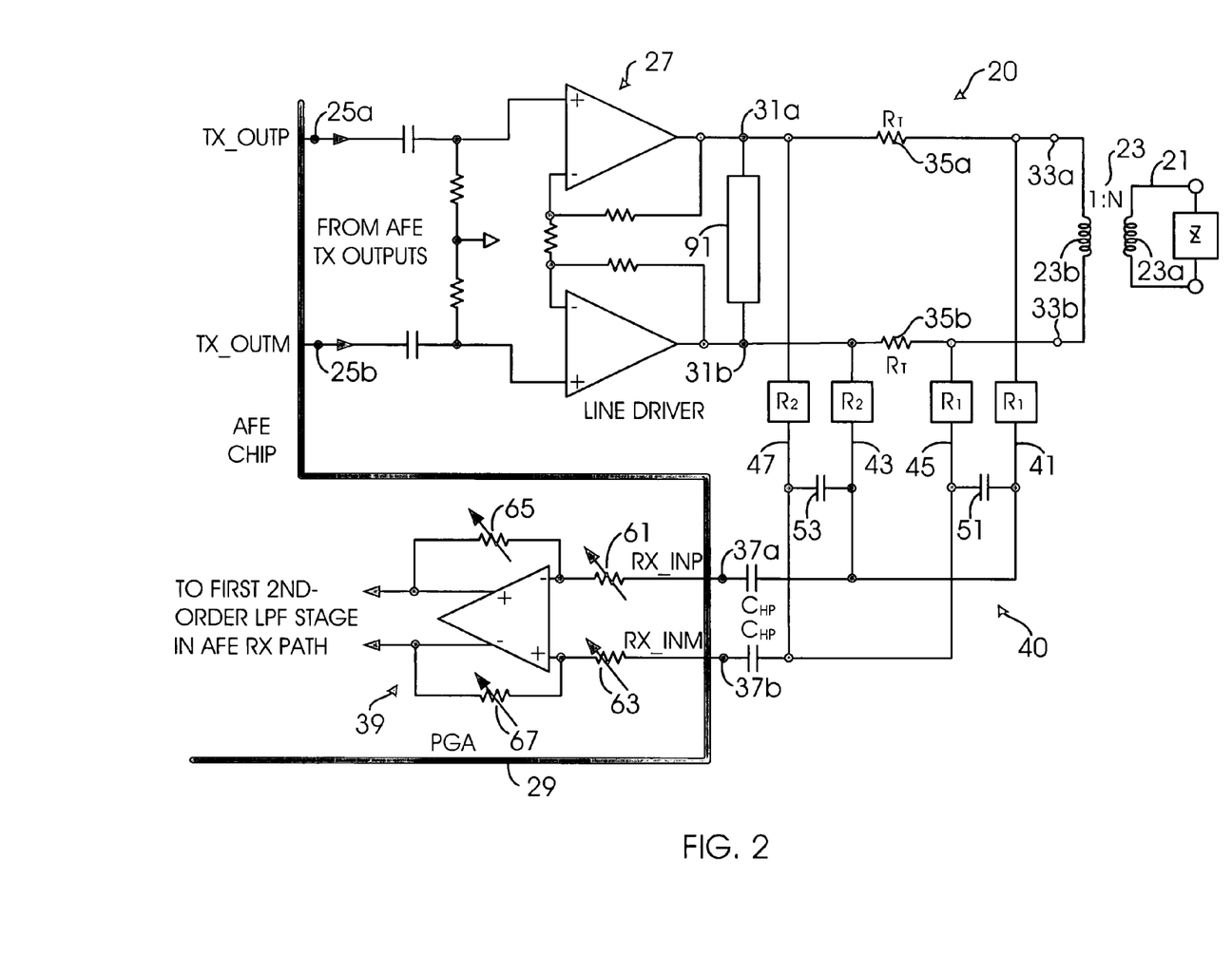
FIG. 2 is an electrical diagram schematically illustrating a line interface in accordance with one embodiment of the present invention.

FIG. 2 schematically illustrates a line interface 20 in accordance with one embodiment of the present invention. The line interface 20 couples a data transceiver to a transmission line 21 having a load impedance Z via a transformer 23. The transformer 23 includes the primary 23a and the secondary 23b, and has a turns ratio of 1:n. The load impedance is typically about 100 Ω for a transmission line such as a telephone line or twisted-pair loop. The data transceiver transmits signals in a first frequency range and receives signals in a second frequency range. The line interface 20 is used, for example, at a central office (CO) of a DSL or ADSL system. In this case, the data transceiver transmits a transmit signal Tx in the first frequency range to a remote terminal (RT) or customers premises equipment (CPE) and receives a receive signal Rx in the second frequency range from an RT or CPE. Typically, the first frequency range is higher than the second frequency range. For example, the first frequency range is 160 kHz to 1.1 MHz, and the second frequency range is 30 kHz to 138 kHz.

As shown in FIG. 2, the line interface 20 includes an input port 25 (first and second input terminals 25a and 25b) and a line driver 27 coupled to the input port 25 in the transmit signal path. The input port 25 receives an input signal voltage (Tx_OUTP and Tx_OUTM) from a circuit (not shown) formed on an analog front end (AFE) chip 29. The line driver 27 amplifies the input signal voltage and supplies an amplified signal as a transmit signal Tx to an output port 31 (first and second output terminals 31a and 31b). The transmit signal Tx is sent via a line port 33 (first and second line terminals 33a and 33b) to the transformer 23. A receive signal Rx from the transmission line 21 (via the transformer 23) is also received at the line port 33.

The line interface 20 further includes termination resistors 35 (first and second termination resistors 35a and 35b) coupled between the output port 31 and the line port 33, a receive signal port 37 (first and second receive signal terminals 37a and 37b) for supplying the receive signal Rx to the AFE chip 29, a receive amplifier 39, and a bridge network 40. The receive amplifier 39 is formed on the AFE chip 29 and coupled to the receive signal port 37. The bridge network 40 resistively couples the line port 33 and the output port 31 to the receive signal port 37. The bridge network 40 has a low-pass filter characteristic. By incorporating the low-pass characteristic into the off-chip bridge network 40, out-of-band components and/or residual echo of the hybrid rejection is reduced from the receive signal path before entering the receive amplifier 39. The low-pass filter characteristic of the bridge network 40 may have a cutoff frequency higher than the second frequency range and lower than the first frequency range. The cutoff frequency may be chosen so that a desirable attenuation of the high frequency component is achieved.

In accordance with one embodiment of the present invention, as shown in FIG. 2, the bridge network 40 includes four resistive paths 41, 43, 45, and 47. The first resistive path 41 has a first resistance $R_1$, and couples the first line terminal 33a to the first receive signal terminal 37a. The second resistive path 43 has a second resistance $R_2$, and couples the second output terminal 31b to the first receive signal terminal 37a. The first and second resistive paths 41 and 43 meet at a first summing node 39a before the first receive signal terminal 37a. The third resistive path 45 has the first resistance $R_1$, and couples the second line terminal 33b to the second receive signal terminal 37b. The fourth resistive path 47 has the second resistance $R_2$, and couples the first output terminal 31a to the second receive signal terminal 37b. The third and fourth resistive paths 45 and 47 meet at a second summing node 39b before the second receive signal terminal 37b.

The bridge network 40 also includes a first capacitor 51 coupled between (and across) the first resistive path 41 and the third resistive path 45, and a second capacitor 53 coupled between (and across) the second resistive path 43 and the fourth resistive path 47. With respect to the first resistive path 41, the capacitance of the first capacitor 51 after the resistance $R_1$ forms an R-C network which provides a first order low-pass filtering to the signal traveling the resistive path 41. The first capacitor 51 also provides a similar low-pass function to the third resistive path 45 to which it couples in the same manner. Similarly, the capacitance of the second capacitor 53, combined with the resistance $R_2$ of the second and fourth resistive paths 43 and 47, provides a first order low-pass filtering to each of the second and fourth resistive paths 43 and 47. The low-pass filter characteristic of this simple configuration provides an additional echo suppression via the bridge network 40 and increases the signal to noise ratio (SNR) at the input of the receive amplifier 39, thereby improving the dynamic range of the receiver.

As shown in FIG. 2, the receive amplifier 39 includes a first input resistor 61 coupled to the first receive signal terminal 37*a*, and the second input resistor 63 coupled to the second receive signal terminal 37*b*. Thus, a combined resistance of the first and second resistive paths 41 and 43 and the first input resistor 61 provides a first effective input resistance for the receive amplifier 39, and a combined resistance of the third and fourth resistive paths 45 and 47 and the second input resistor 63 provides a second effective input resistance for the receive amplifier 39. That is, the receive amplifier 39 is configured as a resistive gain stage with the source resistance distributed among the on-chip resistance (the input resistors 61 and 63) and the off-chip resistances ($R_1$ and $R_2$ of the bridge network 40). This configuration, combined with the low-pass filter characteristic, allows the AFE chip 29 to be directly connected to the signal line using only external resistors and capacitors in a passive manner, i.e., without any additional active components or inductors, simplifying the hybrid circuit and reducing the number of external components.

Furthermore, since the receive amplifier 39 is formed on-chip, the input resistors 61 and 63 can be made variable (i.e., programmable) to implement a programmable gain. Thus, these combined resistances are also controllable by adjusting the first and second input resistors 61 and 63. For example, the on-chip resistors are selected and programmed such that, with the off-chip resistances $R_1$ and $R_2$, provide an amplification factor (gain) and a dynamic range required by the standards or system specification. In addition, in accordance with one embodiment of the present invention, the receive amplifier 39 may also include programmable feedback resistors 65 and 67 so as to further control the gain thereof.

In accordance with one embodiment of the present invention, the ratio of the first resistance $R_1$ and the second resistance $R_2$ is expressed as:

$$\frac{R_1}{R_2} = \frac{\frac{Z}{2n^2}}{R_T + \frac{Z}{2n^2}},$$

where $R_T$ is a resistance of the first and second termination resistors 35*a* and 35*b*. When the termination resistance $R_T$ satisfies $$R_T = \frac{Z}{2n^2},$$

the ratio of the first and second resistance $R_1$ and $R_2$ becomes 1:2. For example, the resistance $R_1$ is set to 1 kΩ and the resistance $R_2$ is set to 2 kΩ when the line impedance Z is 100 Ω which is typical in a DSL/ADSL system.

Figure 3:
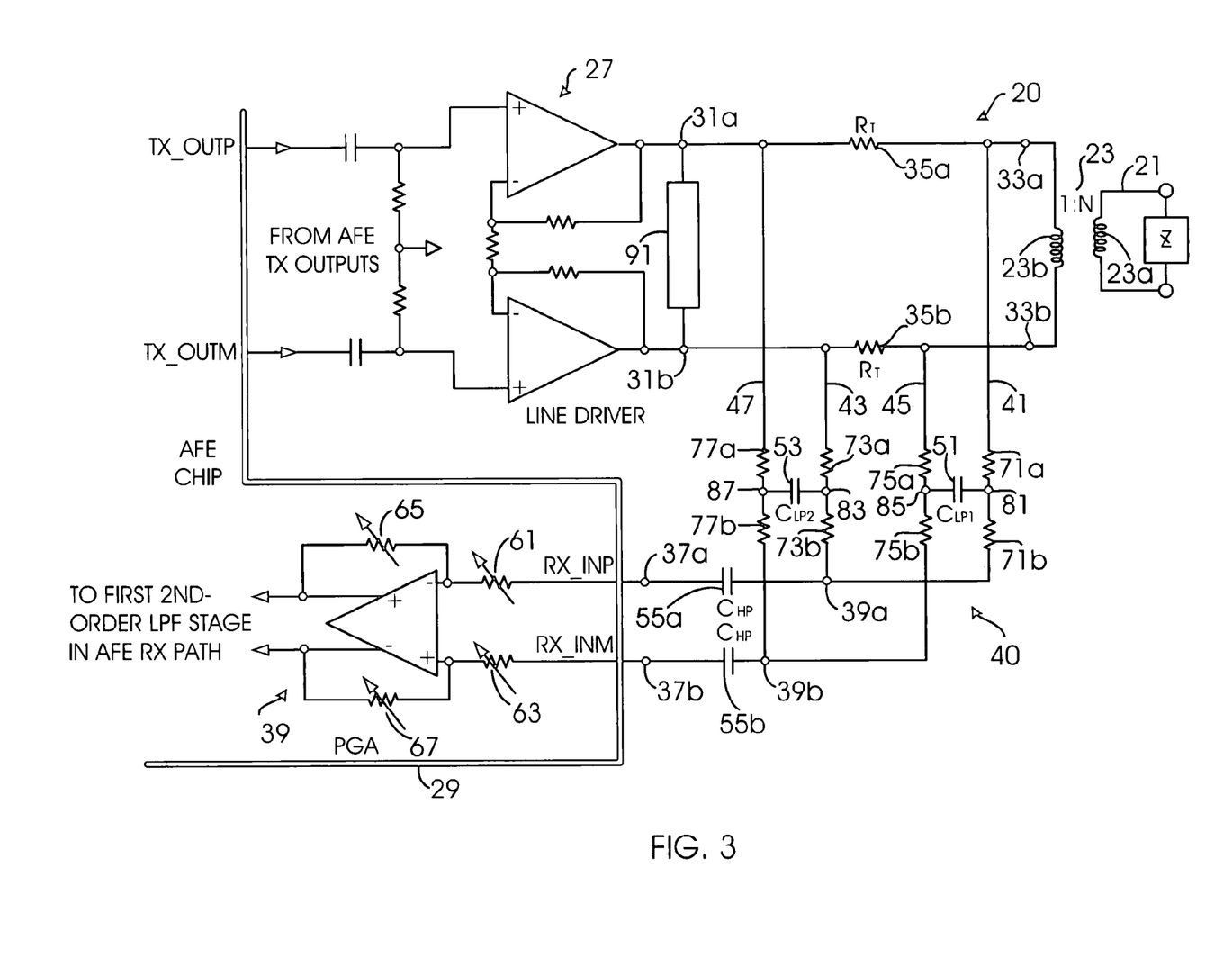
FIG. 3 is an electrical diagram schematically illustrates a line interface in accordance with one embodiment of the present invention.

In accordance with one embodiment of the present invention, as shown in FIG. 3, the resistance $R_1$ of the first resistive path 41 is implemented using first and second resistors 71*a* and 71*b* interconnected by a first node 81, and the second resistance $R_2$ of the second resistive path 43 is implemented using third and fourth resistors 73*a* and 73*b* interconnected by a second node 83. Similarly, the first resistance $R_1$ of the third resistive path 45 is implemented using fifth and sixth resistors 75*a* and 75*b* interconnected by a third node 85, and the second resistance $R_2$ of the fourth resistive path 47 is implemented using seventh and eighth resistors 77*a* and 77*b* interconnected by a fourth node 87. The first capacitor 51 is connected between the first node 81 and the third node 85, and the second capacitor 53 is connected between the second node 83 and the fourth node 87, as shown in FIG. 3.

In a preferred embodiment of the present invention, in the first resistive path 41, a resistance of the second resistor 71*b* is substantially greater than that of the first resistor 71*a*. Similarly, a resistance of the fourth, sixth, and eighth resistors 73*b*, 75*b*, and 77*b* is set substantially greater than that of the third, fifth, and seventh resistor 73*a*, 75*a*, and 77*a*, respectively. By choosing resistances in this way, the resistor with a smaller resistance mainly contributes the low-pass filter function of the corresponding resistive path, and the resistor with a larger resistance works as a buffer so that the low-pass filter characteristic is not substantially affected when the on-chip resistance is changed to adjust the gain of the receive amplifier 39.

In accordance with one embodiment of the present invention, the bridge network 40 further includes a third capacitor 55*a* and a fourth capacitor 55*b* connected in series to the receive signal path in the bridge network 40. As shown in FIG. 3, the third capacitor 55*a* is provided for the first and second resistive paths 41 and 43, preferably between the first receive signal terminal 37*a* and the first summing node 39*a* at which the first and second resistive paths 41 and 43 meet. Similarly, the fourth capacitor 55*b* is provided for the third and fourth resistive paths 45 and 47, preferably between the second receive signal terminal 37*b* and the second summing node 39*b* at which the third and fourth resistive paths 45 and 47 meet. The capacitance connected in series to the signal paths provides a high-pass filter characteristic to the bridge network 40, which suppresses a frequency component lower than the frequency range allocated to the receive signal Rx, typically including a DC component.

Alternatively, the high-pass filter function of the bridge network may be provided by capacitors coupled between the line port 33 and the resistances $R_1$ and $R_2$. In accordance with on embodiment of the present invention, as show in FIG. 4, the bridge network 40' further includes a third capacitor 56 for the first resistive path 41, a fourth capacitor 57 for the second resistive path 43, a fifth capacitor 58 for the third resistive path 45, and a sixth capacitor 59 for the fourth resistive path 47. The third capacitor 56 is coupled between the first line terminal 33*a* and the first resistor 71*a*, the fourth capacitor 57 is coupled between the second output terminal 31*b* and the third resistor 73*a*, the fifth capacitor 58 is coupled between the second line terminal 33*b* and the fifth resistor 75*a*, and the sixth capacitor 59 is coupled between the first output terminal 31*a* and the seventh resistor 77*a*. This configuration provides the high-pass filtering before the low-pass filtering.

Although the hybrid circuit described in the previous embodiments has a simple structure with a pair of the termination resistors 35*a* and 35*b*, the present invention is not limited to this structure. An active termination scheme, which is well understood by one of ordinary skilled in the art, may be employed with the bridge network 40 or 40' in accordance with one embodiment of the present invention.

In addition, as shown in FIGS. 2 and 3, a line-impedance matching circuit 91 may also be used in order to compensate line-impedance variations depending on the type of the transmission line 21.

Figure 4:
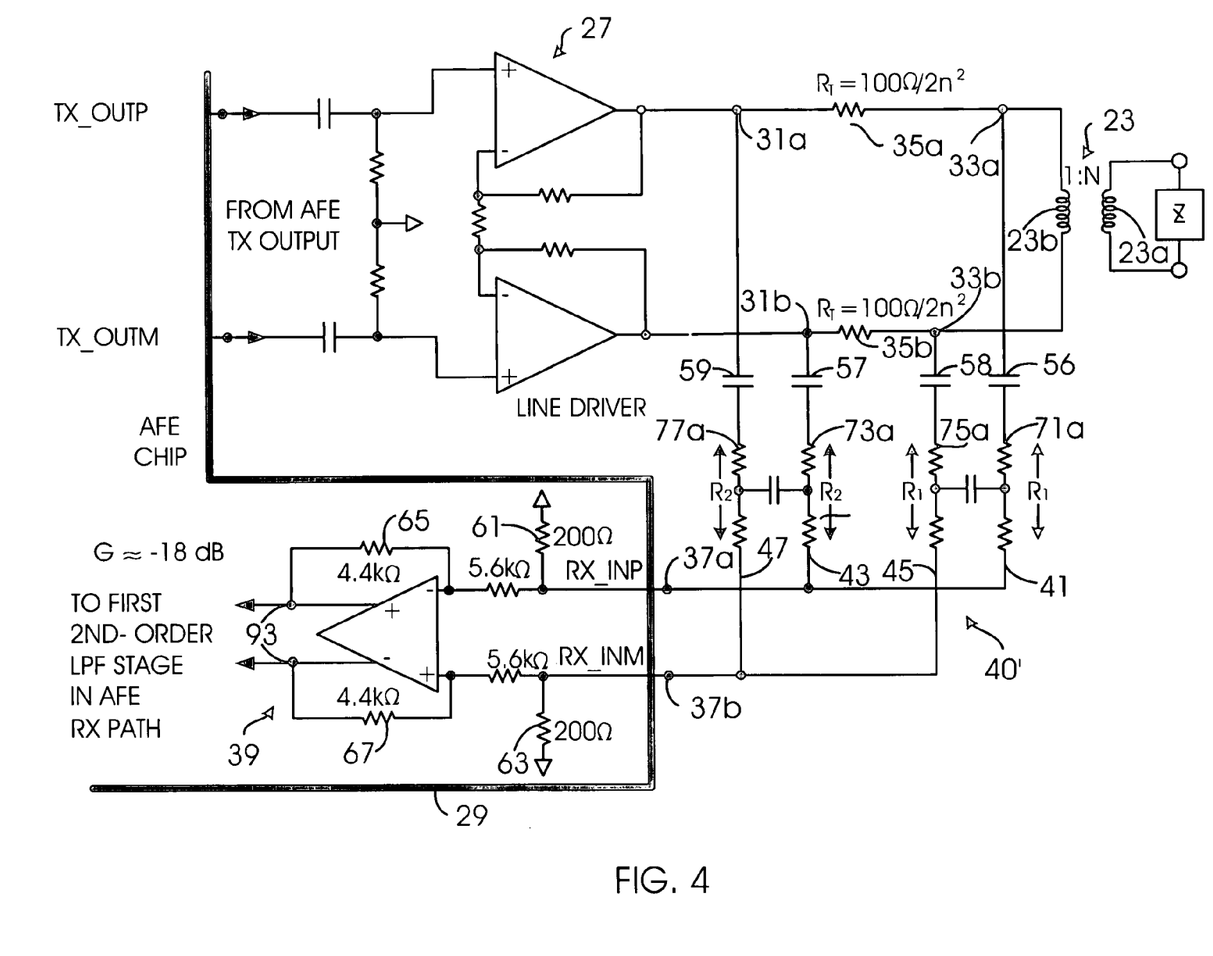
FIG. 4 is an electrical diagram schematically illustrating an example of a line interface where the receive amplifier has a programmable gain of about −18 dB in accordance with one embodiment of the present invention.

FIG. 4 schematically illustrates an example of a line interface where the on-chip (programmable) resistors 61–67 are set so that with the off-chip resistances $R_1$ (=1 k$\Omega$) and $R_2$ (=2 k$\Omega$), the gain G of the receive amplifier 39 is about −18 dB. The gain of the receive amplifier 39 is defined as the voltage seen by the receive signal Rx from the secondary 23b of the transformer 23 to the output 93 of the receive amplifier 39. The gain of about −18 dB can cover the case of very short transmission lines.

Figure 5:
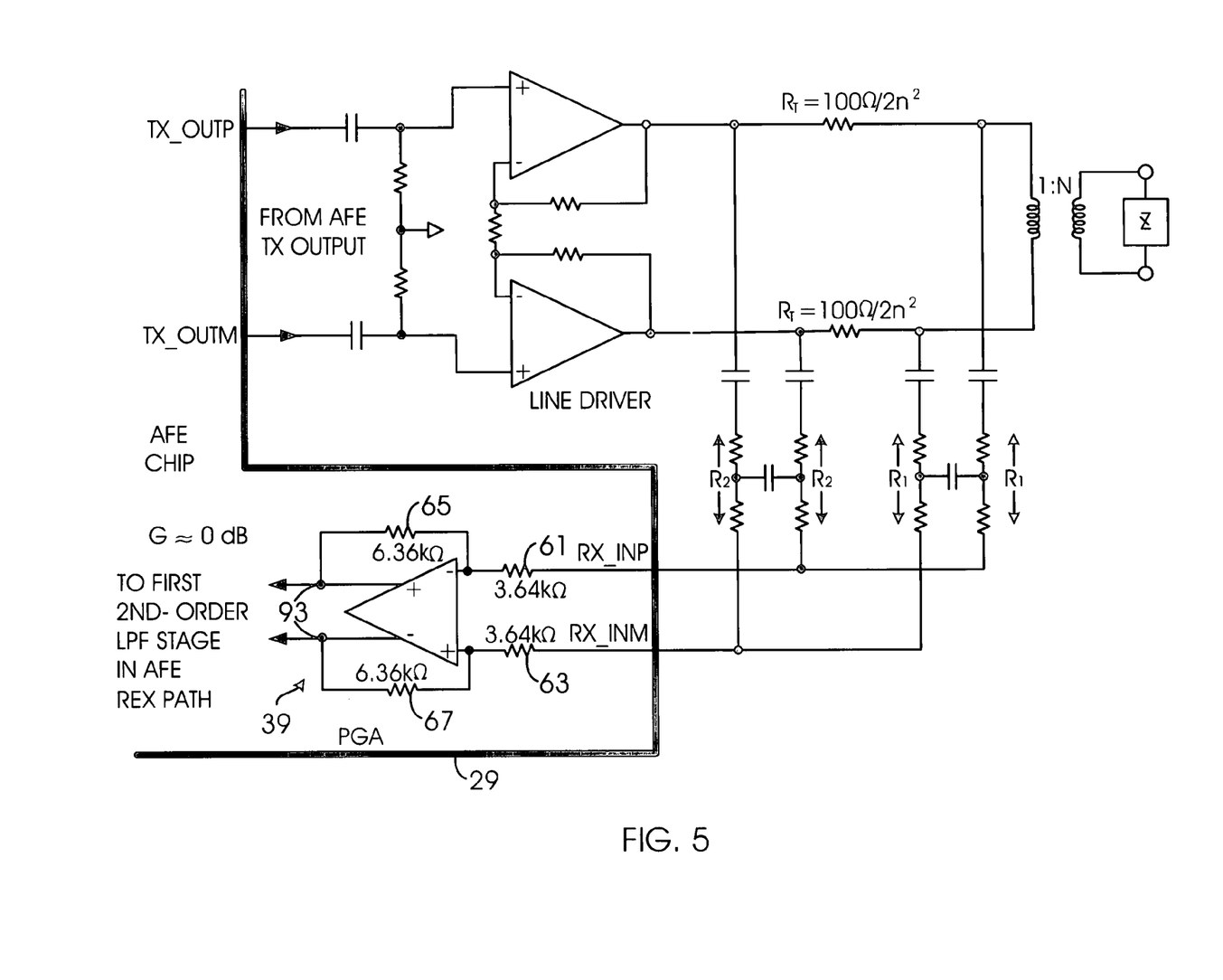
FIG. 5 is an electrical diagram schematically illustrating an example of a line interface where the receive amplifier has a programmable gain of about 0 dB in accordance with one embodiment of the present invention.
Figure 6:
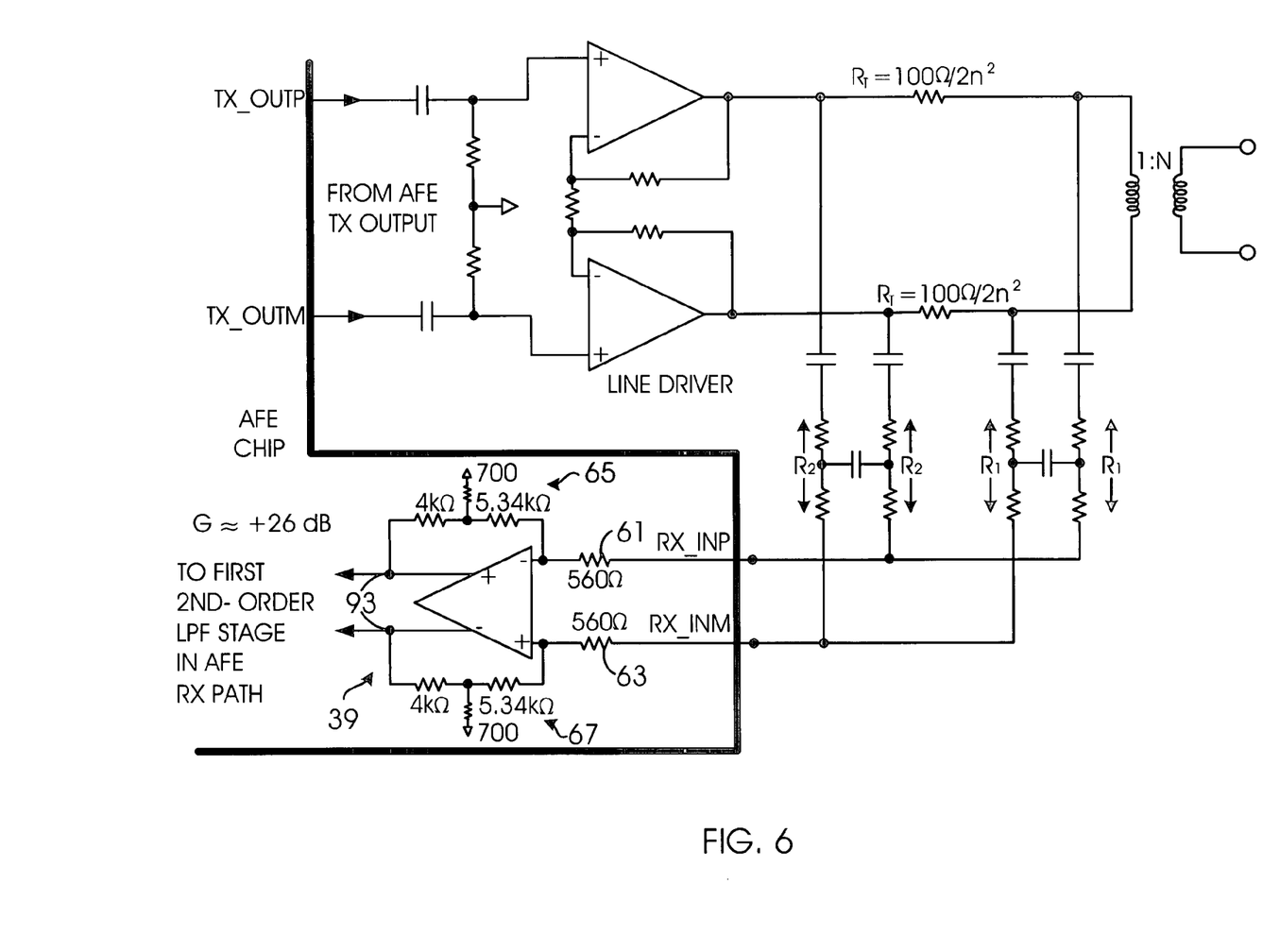
FIG. 6 is an electrical diagram schematically illustrating an example of a line interface where the receive amplifier has a programmable gain of about +26 dB in accordance with one embodiment of the present invention.

FIG. 5 schematically illustrates another example of a line interface where the on-chip (programmable) resistors 61–67 are set so that with the off-chip resistances $R_1$ (=1 k$\Omega$) and $R_2$ (=2 k$\Omega$), the gain G of the receive amplifier 39 is about 0 dB. FIG. 6 schematically illustrates yet another example of a line interface where the on-chip (programmable) resistors 61–67 are set so that with the off-chip resistances $R_1$ (=1 k$\Omega$) and $R_2$ (=2 k$\Omega$), the gain G of the receive amplifier 39 is about +26 dB.

The position of the first-order pole (cutoff frequency) for the off-chip low-pass filter characteristic is chosen so as to give significant (∼−25 dB) attenuation of downstream energy (i.e., energy from the transmit signal Tx), while at the same time yielding a satisfactory overall low-pass filter response to the upstream energy (i.e., receive signal Rx). Here, it is assumed that the frequency range of the downstream energy begins at about 170 kHz. Although the exact values can be optimized for actual applications, the external low-pass filtering realizes at least an additional 25 dB of attenuation of the out-of-band transmit signal Tx. This allows the receive amplifier gain to be increased by 25 dB, which in turn gives lower input-referred noise.

Furthermore, it should be noted that although the off-chip low-pass filtering is implemented by a single capacitor for each resistive path, i.e., a first-order R-C circuit, the low-pass filter function may also be provided using a more complex network. For example, the off-chip low pass filter can be implemented as a second-order R-C circuit, i.e., with 2 real poles, or as a second-order L-C circuit. Although using the L-C circuit provides a better out-of-band rejection, it would make the bridge circuit more complicated, and the inductors become large. In addition, an off-chip R-C network having a cutoff frequency further down, for example, at around 100 kHz or 80 kHz, may be used to obtain a sufficient out-of-band rejection for the receive signal path. In this case, the on-chip filter may need to be modified so that the overall low-pass filter response is satisfactory.

Figure 7:
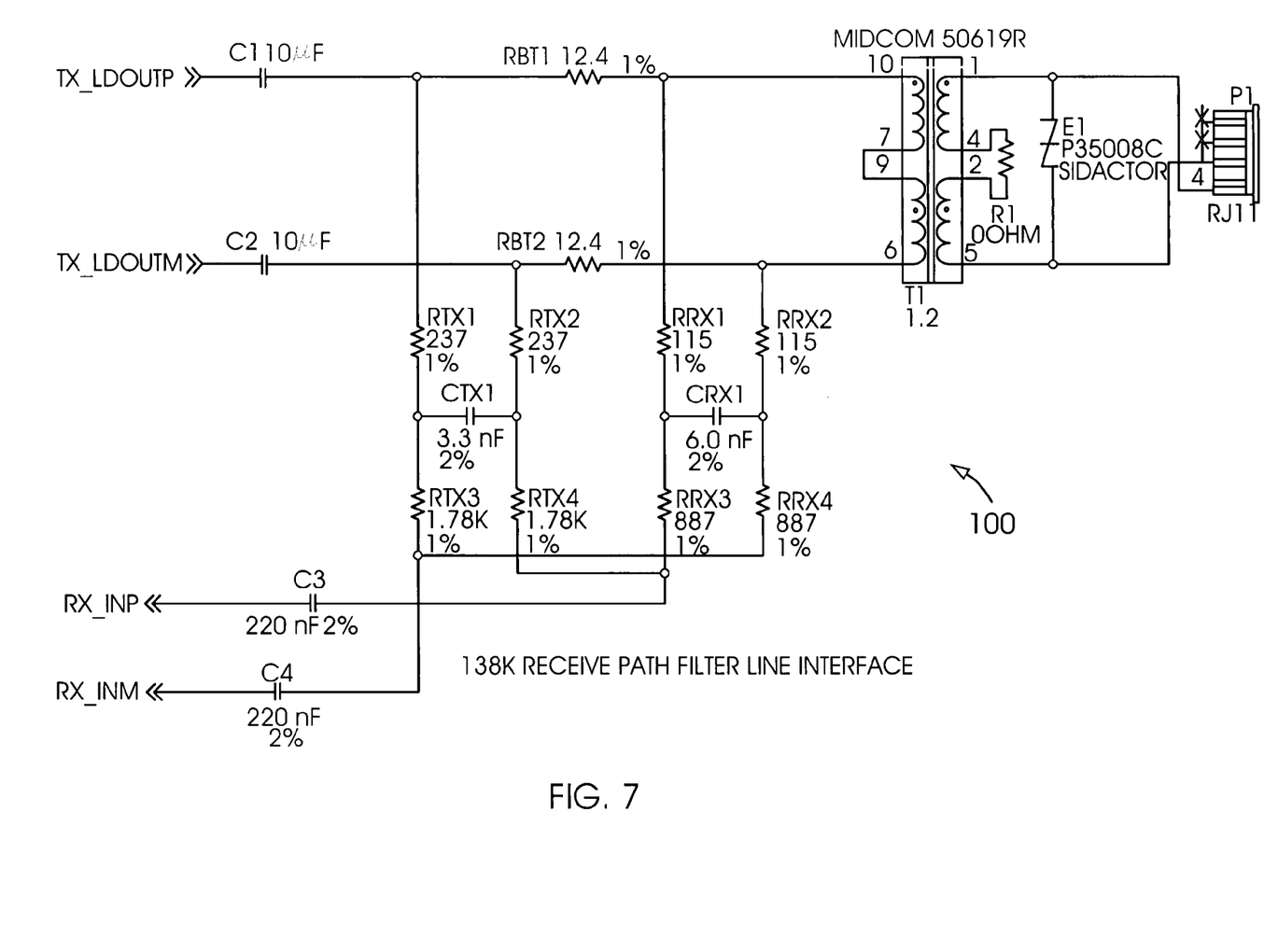
FIG. 7 is an electrical diagram schematically illustrating an examples of a line interface for an ADSL over Plain Old Telephone Service (POTS) in accordance with one embodiment of the present invention.
Figure 8:
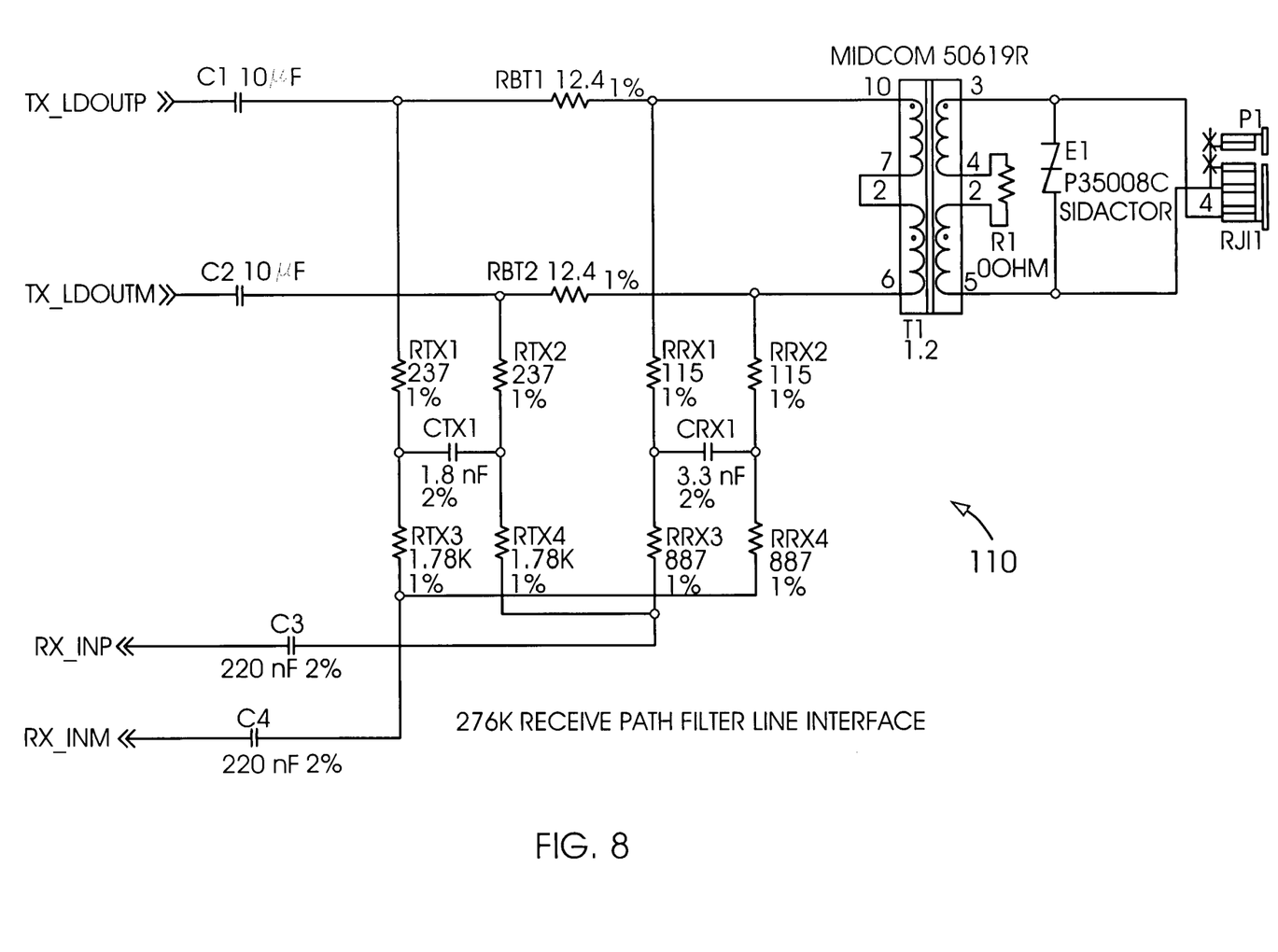
FIG. 8 is an electrical diagram schematically illustrating an examples of a line interface for an ADSL over Integrated Services Digital Network (ISDN) in accordance with one embodiment of the present invention.

FIG. 7 schematically illustrates an examples of a line interface 100 for an ADSL Annex A, i.e., ADSL over Plain Old Telephone Service (POTS) in accordance with one embodiment of the present invention. FIG. 8 schematically illustrates an example of a line interface 110 for an ADSL Annex B, i.e., ADSL over Integrated Services Digital Network (ISDN) in accordance with one embodiment of the present invention. It should be noted, however, these examples are merely illustrative, and the values of the components may be varied.

Figure 9:
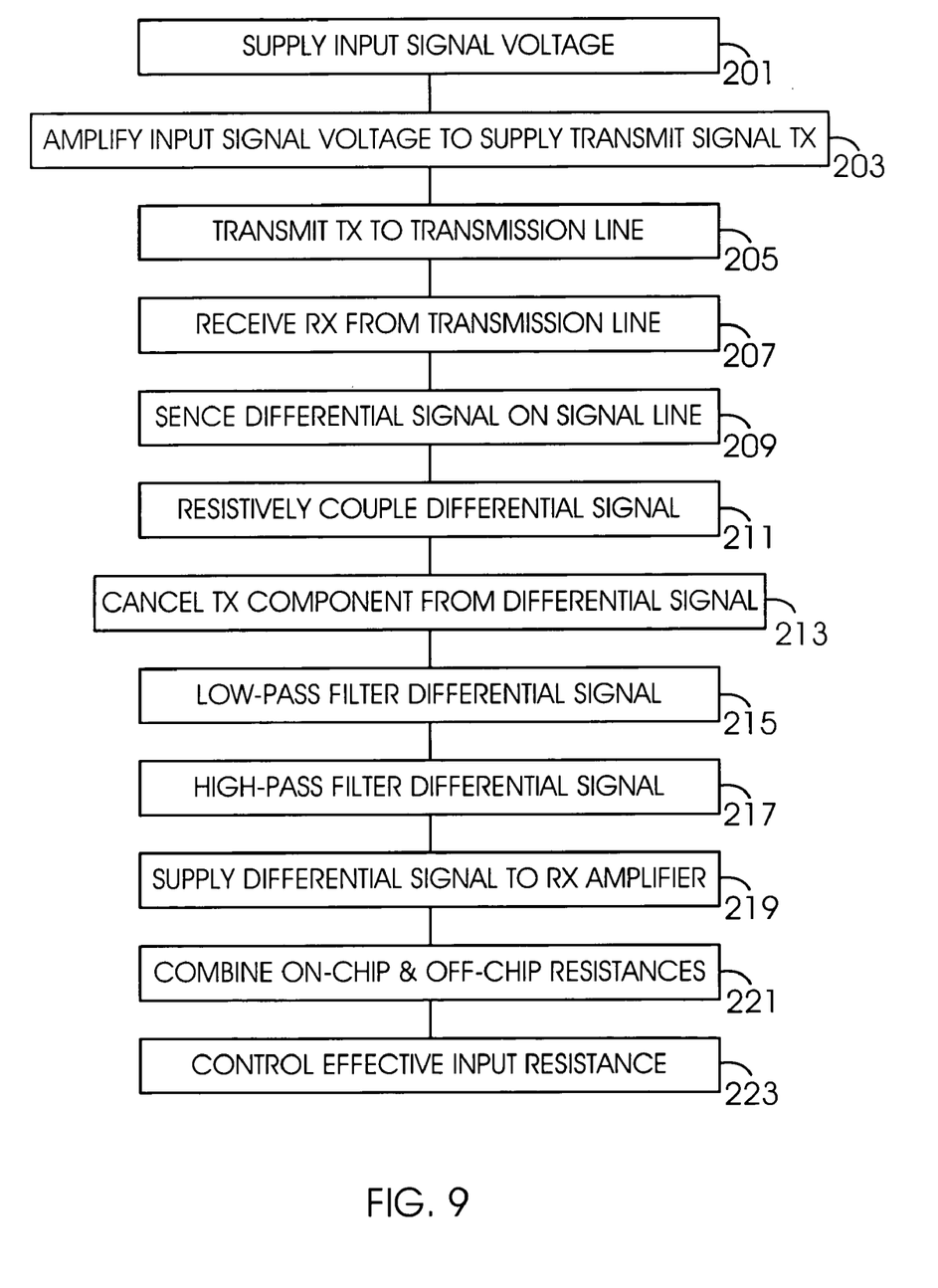
FIG. 9 is a process flow diagram schematically illustrating a method for interfacing a data transceiver with a transmission line via a transformer in accordance with one embodiment of the present invention.

FIG. 9 schematically illustrates a method for interfacing a data transceiver with a transmission line via a transformer in accordance with one embodiment of the present invention. The transmission line has a load impedance Z, and the transformer has a turns ratio of 1:n. The data transceiver transmits signals in a first frequency range and receives signals in a second frequency range different from the first frequency range. The method may be performed with the line interface 20 as described above. First, an input signal voltage is supplied to a line driver from a circuit formed on an analog front end (AFE) chip (201). The input signal voltage is amplified by the line driver, and supplied as a transmit signal Tx to a signal line having termination resistors (203). The transmit signal Tx is transmitted to the transmission line via the transformer (205).

A receive signal Rx is received onto the signal line from the transmission line via the transformer (207), and sensed as a differential signal across the termination resistors (209). The differential signal is resistively coupled to the AFE chip via a bridge network (211). A transmit signal component of the differential signal is substantially cancelled via the bridge network (213). The differential signal is also low-pass filtered via the bridge network (215), whereby a frequency component of the differential signal higher than the second frequency range is suppressed. The resultant differential signal is supplied to a receive amplifier formed on the AFE chip (219).

In accordance with one embodiment of the present invention, as shown in FIG. 9, the differential signal may also be high-pass filtered via the bridge network before entering the AFE chip (217). By high-pass filtering, a frequency component of the differential signal lower than the second frequency range (typically including a DC component) is also suppressed.

In addition, when the receive amplifier includes programmable input resistors, the resistance of the programmable input resistors (i.e., on-chip resistance) and a resistance of the bridge network (i.e., off-chip resistance) may be combined to form an effective input resistance for the receive amplifier (221). The effective input resistance is controlled to obtain a desirable amplification factor (gain) of the receive amplifier (223).

Furthermore, when the receive amplifier further includes programmable feedback resistors, such programmable feedback resistors may also be controlled to obtain the desirable amplification factor of the receive amplifier.

While embodiments and applications of this invention have been shown and described with specific examples, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A line interface for coupling a data transceiver to a transmission line having a load impedance Z via a transformer having a turns ratio of 1:n, said data transceiver transmitting signals in a first frequency range and receiving signals in a second frequency range different from said first frequency range, said line interface comprising:

an input port for receiving an input signal voltage from a circuit formed on an analog front end (AFE) chip;

an output port;

a line driver coupled between said input port and said output port, said line driver amplifying the input signal voltage and supplying an amplified signal as a transmit signal to said output port;

a line port for sending the transmit signal to and receiving a receive signal from the transformer;

termination resistors coupled between said output port and said line port;

a receive signal port for supplying the receive signal to said AFE chip;

a receive amplifier formed on said AFE chip, coupled to said receive signal port; and a bridge network including a first pair of resistive paths resistively coupling said line port to said receive signal port, and a second pair of resistive paths resistively coupling said output port to said receive signal port, said bridge network having a low-pass filter characteristic, wherein said first pair of resistive paths are coupled each other via a capacitor provided therebetween, and said second pair of resistive paths are coupled each other via a capacitor provided therebetween.

2. A line interface according to claim 1, wherein said bridge network includes coupling resistors, and said receive amplifier includes input resistors and feedback resistors, said coupling resistors and said input resistors providing a combined input resistance for said receive amplifier.

3. A line interface according to claim 2, wherein said input resistors includes programmable resistors.

4. A line interface according to claim 2, wherein said feedback resistors include programmable resistors.

5. A line interface according to claim 1, wherein said bridge network has a cutoff frequency higher than said second frequency range and lower than said first frequency range.

6. A line interface for coupling a data transceiver to a transmission line having a load impedance Z via a transformer having a turns ratio of 1:n, said data transceiver transmitting signals in a first frequency range and receiving signals in a second frequency range different from said first frequency range, said line interface comprising:

an input port including a first input terminal and a second input terminal, said input port receiving an input signal voltage from a circuit formed on an analog front end (AFE) chip;

an output port including a first output terminal and a second output terminal;

a line driver coupled between said input port and said output port, said line driver amplifying the input signal voltage and supplying an amplified signal voltage as a transmit signal to said output port;

a line port including a first line terminal and a second line terminal, said line port sending the transmit signal to and receiving a receive signal from the transformer;

a first termination resistor coupled between said first output terminal and said first line terminal;

a second termination resistor coupled between said second output terminal and said second line terminal;

a receive signal port including a first receive signal terminal and a second receive signal terminal, said receive signal port supplying the receive signal to said AFE chip;

a receive amplifier coupled to said receive signal port, said receive amplifier being formed on said AFE chip; and a bridge network having a low-pass filter characteristic, said bridge network including:

a first resistive path having a first resistance $R_1$, coupling said first line terminal to said first receive signal terminal through a first summing node;

a second resistive path having a second resistance $R_2$, coupling said second output terminal to said first summing node;

a third resistive path having the first resistance R1, coupling said second line terminal to said second receive signal terminal through a second summing node;

a fourth resistive path having the second resistance R2, coupling said first output terminal to said second summing node;

a first capacitor coupled between said first resistive path and said third resistive path; and a second capacitor coupled between said second resistive path and said fourth resistive path.

7. A line interface according to claim 6, wherein said receive amplifier includes:

a first input resistor coupled to said first receive signal terminal; and a second input resistor coupled to said second receive signal terminal.

8. A line interface according to claim 7, wherein said first and second input resistors include programmable resistors.

9. A line interface according to claim 7, wherein a combined resistance of said first and second resistive paths and said first input resistor provides a first effective input resistance for said receive amplifier, and wherein a combined resistance of said third and fourth resistive paths and said second input resistor provides a second effective input resistance for said receive amplifier.

10. A line interface according to claim 7, wherein said receive amplifier further includes programmable feedback resistors.

11. A line interface according to claim 6, wherein said first resistive path includes:

a first node coupled to said first capacitor;

a first resistor provided between said first node and said fist line terminal; and a second resistor provided between said first node and said first summing node, wherein said second resistive path includes:

a second node coupled to said second capacitor;

a third resistor provided between said second node and said second output terminal; and a fourth resistor provided between said second node and said first summing node, wherein said third resistive path includes:

a third node coupled to said first capacitor;

a fifth resistor provided between said third node and said second line terminal; and a sixth resistor provided between said third node and said second summing node, and wherein said fourth resistive path includes:

a fourth node coupled to said second capacitor;

a seventh resistor provided between said fourth node and said first output terminal; and an eighth resistor provided between said fourth node and said second summing node.

12. A line interface according to claim 11, wherein a resistance of said second resistor is substantially greater than a resistance of said first resistor.

13. A line interface according to claim 11, wherein a resistance of said fourth resistor is substantially greater than a resistance of said third resistor.

14. A line interface according to claim 11, wherein a resistance of said sixth resistor is substantially greater than a resistance of said fifth resistor.

15. A line interface according to claim 11, wherein a resistance of said eighth is substantially greater than a resistance of said seventh resistor.

16. A line interface according to claim 11, wherein said bridge network further includes:

a third capacitor coupled between said first receive signal terminal and said first summing node; and a fourth capacitor coupled between said second receive signal terminal and said second summing node.

17. A line interface according to claim 11, wherein said bridge network further includes:

- a third capacitor coupled between said first line terminal and said first resistor;
- a fourth capacitor coupled between said second output terminal and said third resistor;
- a fifth capacitor coupled between said second line terminal and said fifth resistor; and
- a sixth capacitor coupled between said first output terminal and said seventh resistor.

18. A line interface according to claim 6, wherein the ratio of said first resistance $R_1$ and said second resistance $R_2$ is expressed as:

$$\frac{R_1}{R_2} = \frac{\frac{Z}{2n^2}}{R_T + \frac{Z}{2n^2}},$$

where $R_T$ is a termination resistance of said first and second termination resistors.

19. A line interface according to claim 18, wherein said termination resistance $R_T$ satisfies:

$$R_T = \frac{Z}{2n^2}.$$

* * * * *